324-77
12-16-75
XR
SR
3,926,367

United States Patent [19]

Bond et al.

[11] 3,926,367

[45] Dec. 16, 1975

[54] COMPLEX FILTERS, CONVOLVERS, AND MULTIPLIERS

[75] Inventors: James W. Bond; Jeffrey M. Speiser, both of San Diego, Calif.

[73] Assignee: The United States of America as represented by the Secretary of the Navy, Washington, D.C.

[22] Filed: Sept. 27, 1974

[21] Appl. No.: 509,755

[52] U.S. Cl. ................ 235/181; 235/156; 235/193; 235/194; 324/77 G

[51] Int. Cl.[2] ...................... G06F 15/34; G06G 7/19

[58] Field of Search ........... 235/152, 156, 164, 181, 235/193, 194; 324/77

[56] References Cited

UNITED STATES PATENTS

| | | | |
|---|---|---|---|
| 3,725,686 | 4/1973 | Ustach | 235/156 |
| 3,749,898 | 7/1973 | Logan | 235/164 |
| 3,800,130 | 3/1974 | Martinson et al. | 235/156 |
| 3,803,390 | 4/1974 | Schaepman | 235/152 |
| 3,803,391 | 4/1974 | Vernet | 235/152 |

OTHER PUBLICATIONS

Hausner: Analog Computer Techniques for Problems in Complex Variables, IEEE Transact. on El. Computers Vol. EC14 No. 6 Dec. 1965 pp. 898–908.

*Primary Examiner*—Felix D. Gruber
*Attorney, Agent, or Firm*—Richard S. Sciascia; Ervin F. Johnston; John Stan

[57] ABSTRACT

A complex multiplier, using only real multipliers, having two pairs of signal inputs, at one pair of which appears the real and the imaginary parts, A and B, of an arbitrary signal A + jB, which had been decomposed into these components prior to appearing at the pair of inputs, at the other pair of signal inputs appearing the real and imaginary parts C and D, of a similarly decomposed, arbitrary, signal C + jD. The complex multiplier comprises four signal summers, two means for inverting a signal, and three signal multipliers. The magnitude of the output signal of the third summer is equal to the magnitude of the imaginary part of the product of the complex signals, A + jB and C + jD, while the magnitude of the output signal of the fourth summer is equal to the magnitude of the real part of the same multiplied complex signals.

6 Claims, 8 Drawing Figures

COMPLEX FILTER USING THREE REAL FILTERS.

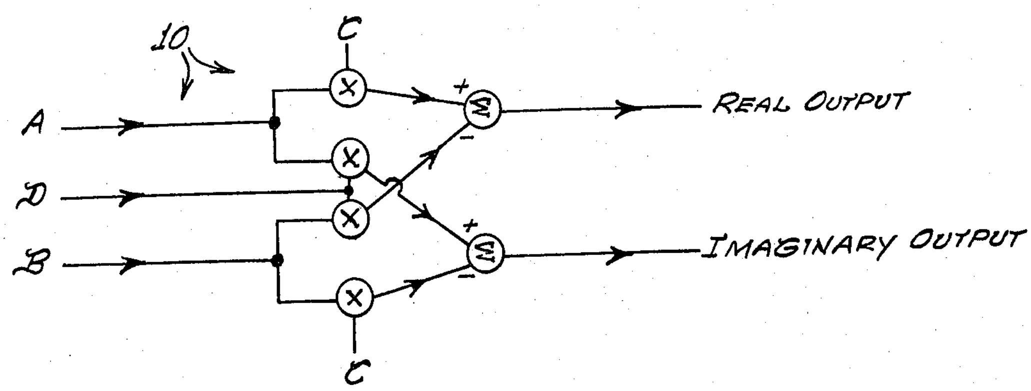
FIG. 1. PRIOR ART COMPLEX MULTIPLIER.
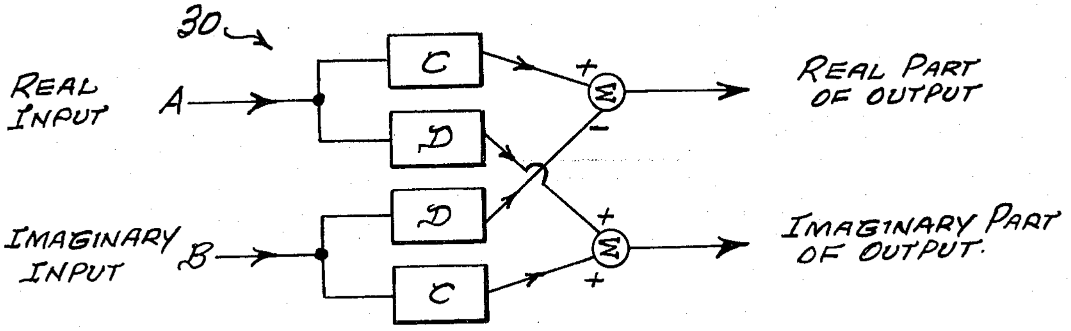
FIG. 2. PRIOR ART COMPLEX FILTER
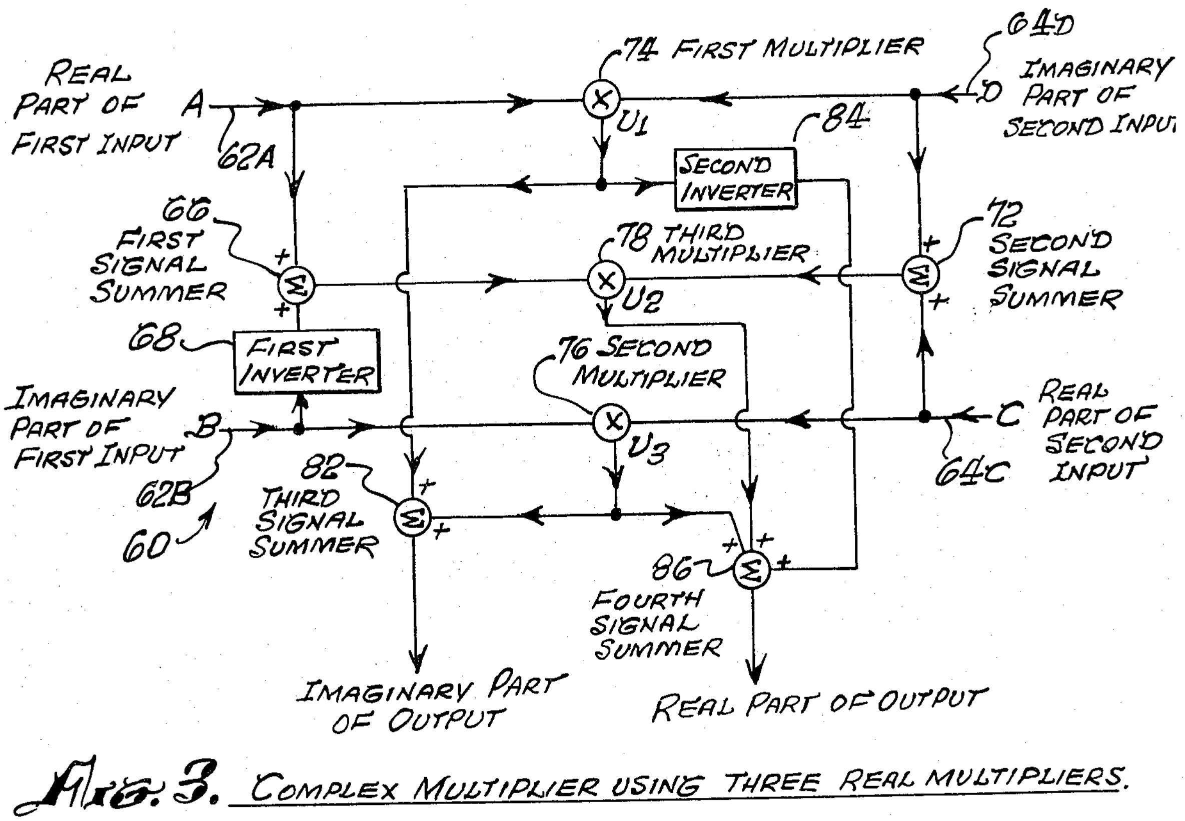
FIG. 3. COMPLEX MULTIPLIER USING THREE REAL MULTIPLIERS.

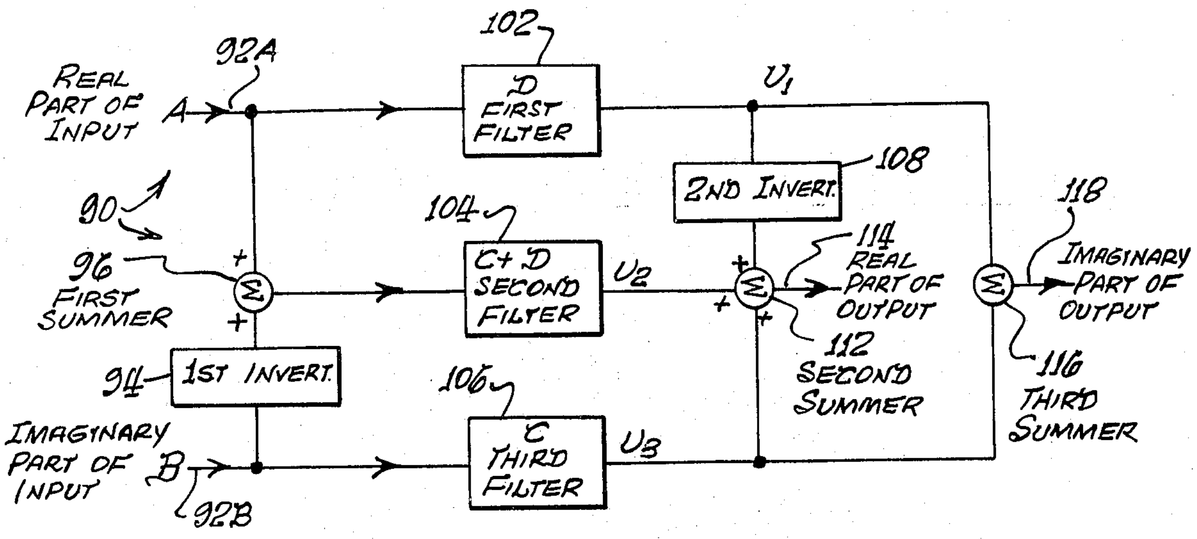
FIG. 4. COMPLEX FILTER USING THREE REAL FILTERS.
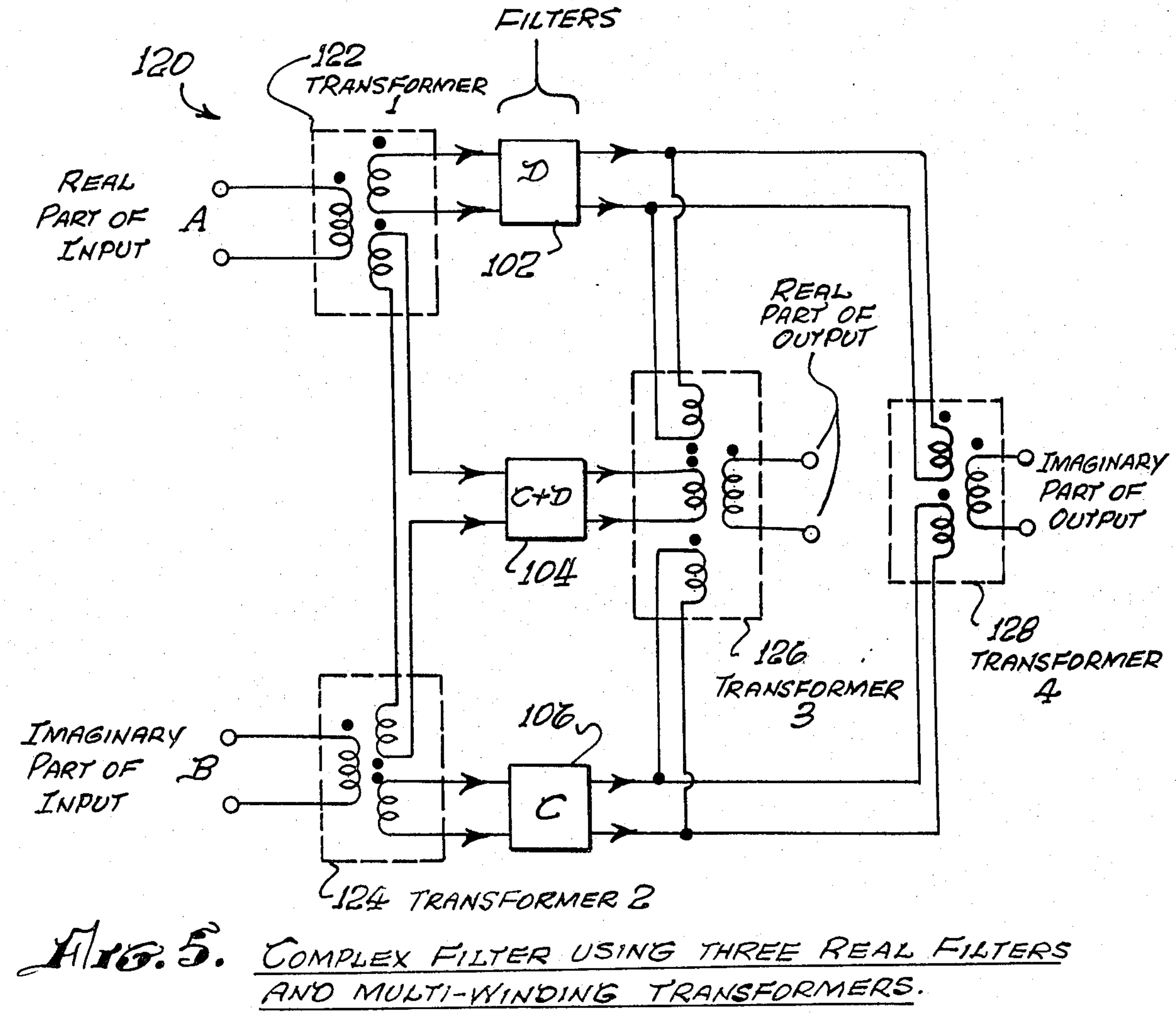
FIG. 5. COMPLEX FILTER USING THREE REAL FILTERS AND MULTI-WINDING TRANSFORMERS.

ACOUSTIC SURFACE WAVE DEVICES FOR A COMPLEX FILTER USING THREE REAL FILTERS.

COMPLEX CROSS-CONVOLVER USING THREE REAL CROSS-CONVOLVERS.

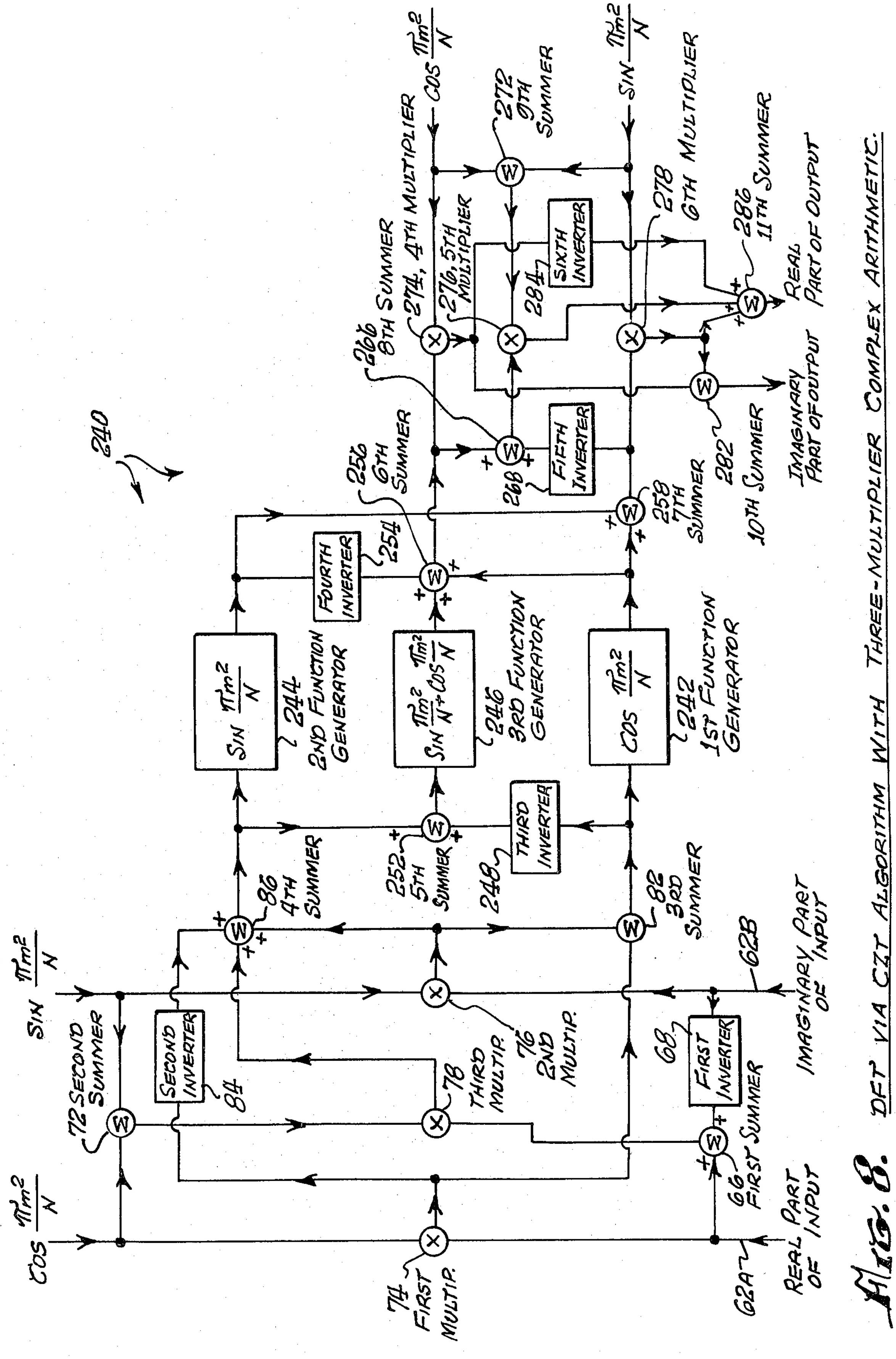
FIG. 8. DFT VIA CZT ALGORITHM WITH THREE-MULTIPLIER COMPLEX ARITHMETIC.

COMPLEX FILTERS, CONVOLVERS, AND MULTIPLIERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many signal processing systems require complex multiplications, complex filters, complex convolutions, or complex cross-correlations. Such applications include sonars, radars, frequency-domain beamformers, and image-processing transform apparatus. Since the real multipliers, filters, or cross-convolvers used to implement the corresponding complex operations tend to be relatively high-cost components in terms of dollars, power dissipation, etc., either for the device itself or for the associated driver amplifiers or clock generators, it is desirable to minimize the number of real multipliers, filters, or convolvers used to implement the corresponding complex operation.

Ordinarily, four real multipliers, filters, or convolvers are used to implement the corresponding complex operations, as is shown the embodiments 10 and 30 in FIGS. 1 and 2. Essentially, the hardware computes separately the four terms AC, BD, BC, AD of equation (1) or the four convolution produces A*C, B*D, B*C, A*D of equation (2).

$$(A+iB)\,C+i\,D) = (AC-BD) + i(AD+BC) \qquad (1)$$

$$(A+iB)*(C+iD) = (A*C-B*D) + i(A*D+B*C) \qquad (2)$$

The convolutions are interpreted as $U*V= \quad U(s)\,V(t-s)\,ds$ for filters or convolvers operating on continuous-time data, or as $$UV_{*} = \sum_s U_s V_{n-s}$$

for filters or convolvers operating on sampled data, as appropriate.

The complex multipliers, complex filters, and complex-cross convolvers, of this invention require only three real multipliers, three real filters, or three real cross-convolvers, respectively, rather than the usual four. This results in an overall reduction of system size, cost, and power dissipation.

SUMMARY OF THE INVENTION

This invention relates to a complex multiplier, using only real multipliers, having two pairs of signal inputs, at one pair of which appears the real and the imaginary parts, A and B, of an arbitrary signal A + jB, which had been decomposed into these components prior to appearing at the pair of inputs, at the other pair of signal inputs appearing the real and imaginary parts C and D, of a similarly decomposed, arbitrary, signal C + jD.

The complex multiplier comprises a first signal summer, one of whose inputs is the signal A, and a first means for inverting a signal, whose input is the signal B and whose output is connected to one of the inputs of the first signal summer. A second signal summer has as inputs the signals C and D.

A first signal multiplier, has as inputs the signals A and D; a second signal multiplier has as inputs the signals B and C, while a third signal mulitplier has its inputs connected to the outputs of the first and second signal summers.

A third signal summer has its inputs connected to the outputs of the first and second multipliers, the output signal of this summer having the magnitude of the imaginary part of the multiplied complex signals, A + jB and C + jD. The complex multiplier also includes a second means for inverting a signal, whose input is connected to the output of the first multiplier; and a fourth signal summer, whose inputs are connected to the output of the second inverter, the third signal multiplier, and the third signal summer, the output signal of this summer having the magnitude of the real part of the multiplied complex signals, A + jB and C + jD.

The invention also comprises complex filters which use only real filters and complex convolvers which utilize only real convolvers.

OBJECTS OF THE INVENTION

An object of the invention is to provide a complex multiplier which uses only real multipliers.

Another object of the invention is to provide a complex multiplier which utilizes fewer real multipliers than prior art complex multipliers.

Yet another object of the invention is to provide a complex filter and a complex convolver which utilize only real filters or convolvers.

Other objects, advantages and novel teachings of the invention will become apparent from the following detailed description of the invention, when considered in conjunction with the accompanying drawings, wherein:

BRIEF DESCRIPTION OF THE DRAWINGS

FIG. 1 is a schematic diagram of a prior art complex multiplier.

FIg. 2 is a block diagram of a prior art complex filter.

FIG. 3 is a block diagram of a complex multiplier of this invention, using three real multipliers.

FIG. 4 is a block diagram of a complex filter using three real filters.

FIG. 5 is a partially schematic and partially block diagram of a complex filter using three real filters and multi-winding transformers.

FIG. 8 is a block diagram of a discrete Fourier transform implementation via a chirp-z transform algorithm with 3-multiplier complex arithmetic.

DESCRIPTION OF THE PREFERRED EMBODIMENTS

Figure 6:
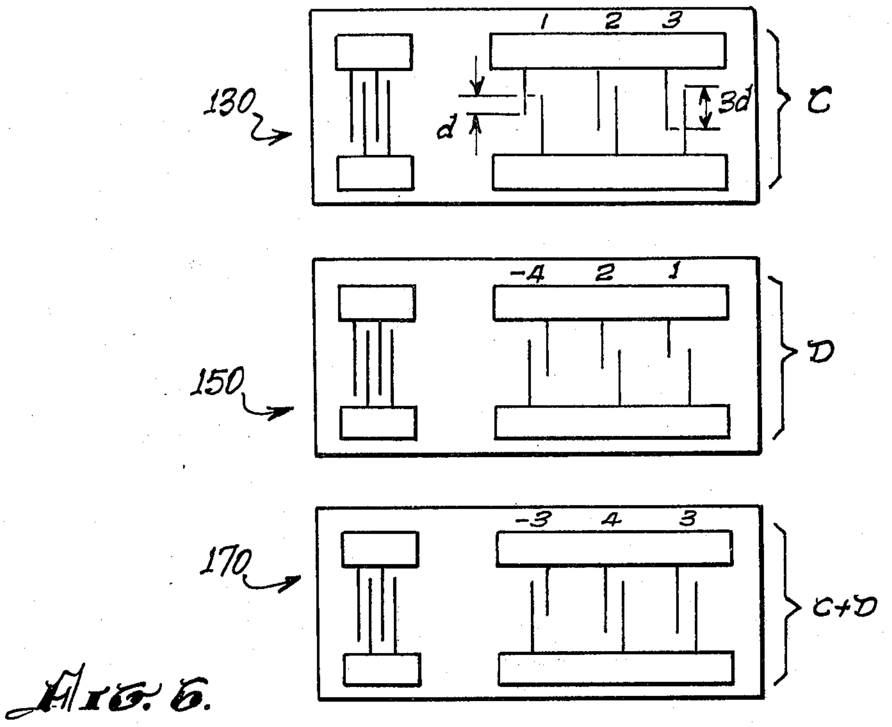
FIG. 6 is a schematic diagram of acoustic surface wave devices for a complex filter using three real filters.

Before describing the various embodiments in detail, the mathematical basis of the invention will be discussed.

The complex multiplier 60 shown in FIG. 3 computes the intermediate terms $U_1$, $U_2$, and $U_3$ given by equations (3)–(5), and then combines them to give the desired real part and imaginary part of the complex product, as shown in equations (6) and (7).

$$U_1 = AD \qquad (3)$$

$$U_2 = (A-B)\,(C+D) \qquad (4)$$

$$U_3 = BC \qquad (5)$$

$$AC-BD = -U_1 + U_2 + U_3 \qquad (6)$$

$$AD + BC = U_1 + U_3 \qquad (7)$$

Figure 7:
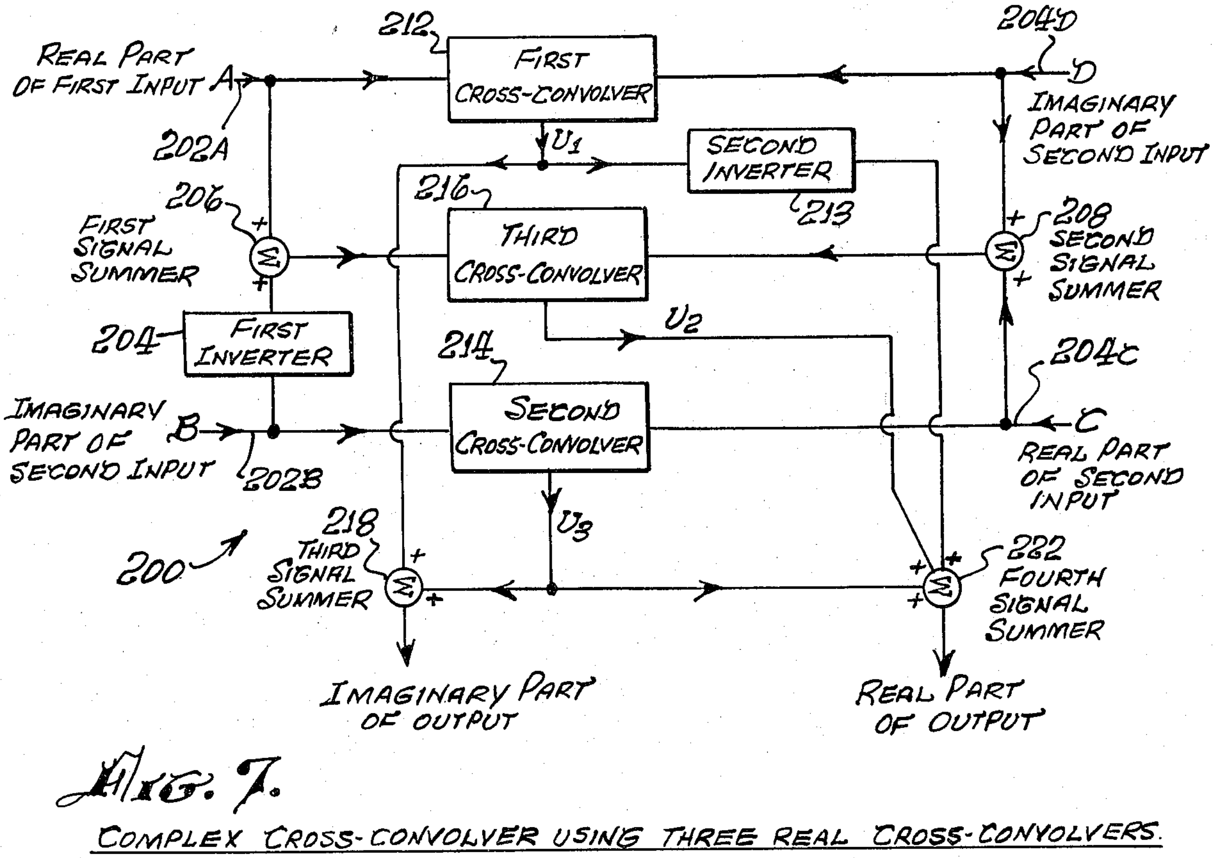
FIG. 7 is a block diagram of a complex cross-convolver using three real cross-convolvers.

Since equation (2) is the same as equation (1) except for replacing the multiplications by convolutions, the multiplications in equations (3)–(7) may be replaced by convolutions to describe the operation of the complex filter 90 of FIG. 4 and the complex cross-convolver 200 of FIG. 7.

Referring now to the embodiments of the invention, and first to the one shown in FIG. 3, therein is illustrated a complex multiplier 60, using only real multipliers, having two pairs of signal inputs, 62A, 62B, and 64C, 64D, at one pair of which appears the real and the imaginary parts, A and B, of an arbitrary signal A + jB, which had been decomposed into these components prior to appearing at the pair of inputs, at the other pair of signal inputs appearing the real and imaginary parts C and D, of a similarly decomposed, arbitrary, signal C + jD. The complex multiplier comprises a first signal summer 66, one of whose inputs is the signal A; a first means for inverting a signal 68, whose input is the signal B, and whose output is connected to one of the inputs of the first signal summer; and a second signal summer 72, whose inputs are the signals C and D.

A first signal multiplier 74 has as inputs the signals A and D; a second signal multiplier 76 has as inputs the signals B and C; and a third signal multiplier 78 has inputs which are connected to the outputs of the first and second signal summers.

A third signal summer 82 has its inputs connected to the outputs of the first and second multipliers, 74 and 76, the output signal of this summer 82 is the desired imaginary part of the multiplied complex signals, that is, the magnitude of the product of the signals, A + jB and C + jD.

A second means 84 for inverting a signal has its input connected to the output of the first multiplier 74. A fourth signal summer 86 has its inputs connected to the outputs of the second inverter 84, and of the second and third signal multipliers, 76 and 78, the output signal of this summer 86 being the magnitude of the real part of the multiplied complex signals, A + jB and C + jD.

Referring now to FIG. 4, therein is shown a complex filter 90, which utilizes only real filters, to which the two components of a complex input signal A + jB may be applied, at inputs 92A and 92B, the complex filter giving the same output which would result from a complex multiplication of the applied input signal A + jB with a complex signal C + jD.

The complex filter 90 comprises a first means for inverting an input signal 94, for example signal B, and a first signal summer 96, at one of whose inputs is applied the signal A, the other input being connected to the signal −B, the output of the inverting means 94. The complex filter 90 also comprises a first filter 102, whose impulse response is D, to which the signal A is also applied; a second filter 104, whose impulse response is C + D, and whose input is the output of the first signal summer 96; and a third filter 106, whose impulse response is C, and whose input is the applied signal B.

The complex filter 90 also includes a second means 108 for inverting an input signal, whose input is connected to the output of the first filter 102; and a second signal summer 112 whose three inputs are connected to the output of the second inverting means 108 and the outputs of the second and third filters, 104 and 106, and whose output 114 comprises the real part of the complex product of the complex numbers A + jB and C + jD.

A third signal summer 116 has its two inputs connected to the outputs of the first and third filters, 102 and 106, its output 118 comprising the imaginary part of the complex product of A + jB and C + jD.

One method of implementing the required sums and differences is shown in FIG. 5, using four multi-winding transformers, 122, 124, 126 and 128. Transformer 122 performs the functions of the first signal summer 96 and the first inverting means 94 of FIG. 4. The functions and equivalents of the other transformers 124, 126 and 128 are readily apparent.

Differential amplifiers or resistive summers may be used in place of the transformers, but they will tend to increase the overall power dissipation. Existing transversal filter design techniques may be used to implement the real filters, 102, 104 and 106, used in FIG. 4.

For example, the first, second and third filters may comprise surface wave devices, 130, 150 and 170, as is shown in FIG. 6. An example of the acoustic surface wave transducer design to implement the complex filter 90 of FIG. 4 is shown in FIG. 6 for the case where the desired complex impulse response is (1−4i), (2+2i), (3+i).

Referring now to FIG. 7, therein is shown a complex cross-convolver 200 having two pairs of signal inputs, 202A and 202B, at one pair of which appears the real and the imaginary parts, A and B, of an arbitrary complex signal A + jB, which had been decomposed into these components prior to appearing at the pair of inputs, at the other pair of signal inputs, 204C and 204D, appearing the real and imaginary parts C and D, of a similarly decomposed, arbitrary, signal C + jD.

The complex cross-convolver 200 comprises a first means 204 for inverting an input signal, whose input is the signal B, and a first signal summer 206, whose input is connected to the output of the first inverting means, whose inputs are the signals A and −B. A second signal summer 208 has as its inputs the signals D and C.

A first cross-convolver 212 has as its inputs the signals A and D. A second means 213 for inverting an input signal has its input connected to the output of the first cross-convolver 212. A second cross-convolver 214 has as its inputs the signals B and C. A third cross-convolver 216 has its inputs connected to the outputs of the first and second signal summers, 206 and 208.

The complex cross-convolver 200 further comprises a third signal summer 218 whose inputs are connected to the outputs of the first and second cross-convolvers, 212 and 214, the output signal of this summer is the imaginary part of the convolved complex signals, A + jB and C + jD. A fourth signal summer 222 has its three inputs connected to the outputs of the second inverter 213 and the second and third cross-convolvers, 214 and 216, the output signal of this summer is the real part of the convolved complex signals, A + jB and C + jD.

A representative example of the combined use of the new complex multipliers and new complex filters is shown in the embodiment 240 shown in FIG. 8, where they are used to perform the premultiplication by a discrete complex chirp, convolution with a discrete complex chirp, and postmultiplication by a discrete complex chirp required to implement a discrete Fourier transform of length N, using the Chirp-z Transform algorithm. The premultiplier and postmultiplier indices of FIG. 8 run from 0 to N-1, and the tap indices run from −(N−1) to (N−1). In more detail, FIG. 8 shows an apparatus 240 for performing a discrete Fourier transform using the chirp-z transform algorithm with 3-multiplier complex arithmetic, comprising a first function generator 242, which generates the function $$\cos \frac{\pi M^2}{N};$$

a second function generator 244, which generates the function $$\sin \frac{\pi M^2}{N};$$

and a third function generator, which generates the function $$\sin \frac{\pi M^2}{N} + \cos \frac{\pi M^2}{N}.$$

A first multiplier 74 has as its inputs the signal $$\cos \frac{\pi M^2}{N}$$

and the real part of the complex input signal. A first signal summer 66 has as one of its input signals the real part of the complex input signal. A first inverter 68 has applied to it the imaginary part of the input signal, the output of the inverter being connected to the other input of the first signal summer 66. A second signal summer 72 has applied to it the signals $$\cos \frac{\pi M^2}{N} \text{ and } \sin \frac{\pi M^2}{N}.$$

A second signal multiplier 76 has as its input signal the imaginary part of the complex input signal and the function $$\sin \frac{\pi M^2}{N}.$$

A third signal multiplier 78 has its inputs connected to the outputs of the first and second signal summers, 66 and 72. A third signal summer 82 has its inputs connected to the outputs of the first and second multipliers, 74 and 76. A second inverter 84 has its input connected to the output of the first mulitplier 74. A fourth signal summer 86 has its inputs connected to the outputs of the second inverter 84 and of the second and third multipliers, 76 and 78.

A third signal inverter 248 has its input connected to the output of the third signal summer 82. A fifth signal summer 252 has its inputs connected to the output of the third inverter 248 and the fourth signal summer 86, its output being connected to the input of the third function generator 246.

A fourth signal inverter 254 has its input connected to the output of the second function generator 244. A sixth signal summer 256 has inputs which comprise the outputs of the first and third function generators, 242 and 246, and of the fourth signal inverter 254. A seventh signal summer 258 has inputs which comprise the outputs of the first and second function generators, 242 and 244.

A fifth inverter 268 has an input which is connected to the output of the seventh signal summer 258. An eighth signal summer 266 has inputs which are connected to the outputs of the fifth inverter 268 and the sixth summer 256.

A fourth multiplier has inputs which are connected to the outputs of the sixth signal summer 256 and the first function generator 242. A ninth signal summer 272 has inputs which are connected to the first and second function generators, 242 and 244. A fifth multiplier 276 has inputs which are connected to the outputs of the eighth and ninth signal summers, 266 and 272. A sixth multiplier 278 has inputs which are connected to the second function generator 244 and to the output of the seventh signal summer 258.

A tenth signal summer 282 has inputs which are connected to the outputs of the fourth and sixth multipliers, 274 and 278, the output of this summer comprising the imaginary part of the output signal. A sixth signal inverter 284 has its input connected to the output of the fourth multiplier 274. An eleventh signal summer 286 has inputs which comprise the outputs of the fifth and sixth multipliers, 276 and 278, and the sixth inverter 284, the output of this summer comprising the real part of the output signal.

As to alternative construction, the multipliers may be balanced mixers, quarter-square multipliers, variable transconductance multipliers, or other analog multipliers. The summers may be transformers, differential amplifiers, hybrids, resistive summers, or other analog summers. The filters may be acoustic surface wave devices, charge transfer devices, magnetostrictive tapped delay lines, or other transversal filters. The convolvers may be acoustic surface wave devices, opto-acoustic correlators, acoustic bulk wave correlators, if digital correlators (or convolvers are used) they will either require A/D and D/A converters to interface with analog summers, or else digital adders / subtractors will be needed.

Obviously, many modifications and variations of the present invention are possible in the light of the above teachings, and, it is therefore understood that within the scope of the disclosed inventive concept, the invention may be practiced otherwise than specifically described.

What is claimed is:

1. A complex multiplier, using only real multipliers, having two pairs of signal inputs, at one pair of which appears the real and the imaginary parts, A and B, of an arbitrary signal A + jB, which had been decomposed into these components prior to appearing at the pair of inputs, at the other pair of signal inputs appearing the real and imaginary parts C and D, of a similarly decomposed, arbitrary, signal C + jD, the complex multiplier comprising:

a first signal summer, one of whose inputs is the signal A;

a first means for inverting a signal, whose input is the signal B, and whose output is connected to one of the inputs of the first signal summer;

a second signal summer, whose inputs are the signals C and D;

a first signal multiplier, whose inputs are the signals A and D;

a second signal multiplier, whose inputs are the signals B and C;

a third signal multiplier whose inputs are connected to the outputs of the first and second signal summers;

a third signal summer, whose inputs are connected to the outputs of the first and second multipliers, the output signal of this summer being the imaginary part of the multiplied complex signals, A + jB and C + jD;

a second means for inverting a signal, whose input is connected to the output of the first multiplier; and a fourth signal summer, whose inputs are connected to the output of the second inverter, and of the second and third signal multipliers, the output signal of this summer being the real part of the multiplied complex signals, A + jB and C + jD.

2. A complex filter, which utilizes only real filters, to which the two components of a complex input signal A + jB may be applied, the complex filter giving the same output which would result from a complex multiplication of the applied input signal A + jB with a complex signal C + jD, comprising:

a first means for inverting an input signal, for example signal B;

a first signal summer, at one of whose inputs is applied the signal A, the other input being connected to the signal −B, the output of the inverting means;

a first filter, whose impulse response is D, to which the signal A is also applied;

a second filter, whose impulse response is C + D, whose input is the output of the first signal summer;

a third filter, whose impulse response is C, and whose input is the applied signal B;

a second means for inverting an input signal, whose input is connected to the output of the first filter;

a second signal summer, whose three inputs are connected to the output of the second inverting means and the outputs of the second and third filters, and whose output comprises the real part of the complex product of the complex numbers A +jB and C + jD; and a third signal summer, whose two inputs are connected to the outputs of the first and third filters and whose output comprises the imaginary part of the complex product of A + jB and C + jD.

3. The complex filter according to claim 2, wherein the first and second inverting means comprise transformers.

4. The complex filter according to claim 2, wherein the first, second and third filters comprise surface wave devices.

5. A complex cross-convolver, having two pairs of signal inputs, at one pair of which appears the real and the imaginary parts, A and B, of an arbitrary signal A + jB, which had been decomposed into these components prior to appearing at the pair of inputs, at the other pair of signal inputs appearing the real and imaginary parts C and D, of a similarly decomposed, arbitrary, signal C + jD, the complex cross-convolver comprising:

a first inverter, whose input is the signal B;

a first signal summer, connected to the first inverter, whose inputs are the signals A and −B;

a second signal summer, whose inputs are the signals D and C;

a first cross-convolver, whose inputs are the signals A and D;

a second inverter, whose input is connected to the output of the first cross-convolver;

a second cross-convolver, whose inputs are the signals B and C;

a third cross-convolver, whose inputs are connected to the outputs of the first and second signal summers;

a third signal summer whose inputs are connected to the outputs of the first and second cross-convolvers, the output signal of this summer having the magnitude of the imaginary part of the convolved complex signals, A + jB and C + jD; and a fourth signal summer, whose three inputs are connected to the outputs of the second inverter and the second and third cross-convolvers, the output signal of this summer having the magnitude of the real part of the convolved complex signals, A + jB and C + jD.

6. Apparatus for performing a discrete Fourier transform using the chirp-z transform algorithm with 3-multiplier complex arithmetic, comprising:

a first function generator, which generates the function $$\cos \frac{\pi M^2}{N};$$

a second function generator, which generates the function $$\sin \frac{\pi M^2}{N};$$

a third function generator, which generates the function $$\sin \frac{\pi M^2}{N} + \cos \frac{\pi M^2}{N};$$

a first multiplier, whose inputs comprise the signals $$\cos \frac{\pi M^2}{N}$$

and the real part of the input signal;

a first summer, one of whose input signals is the real part of the input signal;

a first means for inverting an input signal, to which is applied the imaginary part of the input signal, the output of the inverting means being connected to the other input of the first signal summer;

a second signal summer, to which are applied the signals $$\cos \frac{\pi M^2}{N} \text{ and } \sin \frac{\pi M^2}{N};$$

a third signal multiplier, whose inputs are connected to the outputs of the first and second signal summers;

a second signal multiplier, whose input signals comprise the imaginary part of the complex input signal and the function $$\sin \frac{\pi M^2}{N};$$

a third signal summer, whose inputs are connected to the outputs of the first and second multipliers;
a second means for inverting an input signal, whose input is connected to the output of the first multiplier;
a fourth signal summer whose inputs are connected to the outputs of the second means for inverting an input signal, and the second and third multipliers;
a third means for inverting an input signal, whose input is connected to the output of the third signal summer;
a fifth signal summer whose inputs are connected to the output of the third means for inverting a signal and the fourth signal summer, and whose output is connected to the input of the third function generator;
a fourth means for inverting a signal whose input is connected to the output of the second function generator;
a sixth signal summer whose inputs comprise the outputs of the first and third function generators and of the fourth means for inverting a signal;
a seventh signal summer whose inputs comprise the outputs of the first and second function generator;
a fifth means for inverting a signal, whose input is connected to the output of the seventh signal summer;
an eighth signal summer whose inputs are connected to the outputs of the fifth means for inverting a signal and the sixth summer;
a fourth multiplier whose inputs are connected to the output of the sixth signal summer and the first function generator;
a ninth signal summer whose inputs are connected to the first and second function generators;
a fifth multiplier whose inputs are connected to the outputs of the eighth and ninth signal summers;
a sixth multiplier whose inputs are connected to the second function generator and to the output of the seventh signal summer;
a tenth signal summer, whose inputs are connected to the outputs of the fourth and sixth multipliers, the output of this summer comprising the imaginary part of the output signal.
a sixth means for inverting an input signal, whose input is connected to the output of the fourth multiplier; and
an eleventh signal summer, whose inputs comprise the outputs of the fifth and sixth multipliers and the sixth means for inverting a signal, the output of this summer comprising the real part of the output signal.

* * * * *